United States Patent
Mäker et al.

(10) Patent No.: US 6,962,640 B2
(45) Date of Patent: Nov. 8, 2005

(54) METHOD FOR PRODUCING AN EMBOSSING ROLLER FROM SILICONE RUBBER FOR THE CONTINUOUS EMBOSSING OF THE SURFACE OF A THERMOPLASTIC FILM

(75) Inventors: Michael Mäker, Hannover (DE); Günter Vogt, Rinteln (DE); Rainer Ohlinger, Hannover (DE)

(73) Assignee: Benecke-Kaliko AG, Hannover (DE)

( * ) Notice: Subject to any disclaimer, the term of this patent is extended or adjusted under 35 U.S.C. 154(b) by 242 days.

(21) Appl. No.: 10/084,381

(22) Filed: Feb. 28, 2002

(65) Prior Publication Data

US 2002/0124954 A1 Sep. 12, 2002

(30) Foreign Application Priority Data

Mar. 7, 2001 (DE) .......................................... 101 10 922

(51) Int. Cl.$^7$ ............................................... B29C 33/40
(52) U.S. Cl. .................... 156/219; 156/257; 156/272.8; 264/224; 264/227
(58) Field of Search ................................ 156/257, 242, 156/272.8, 259, 219; 264/224, 227

(56) References Cited

U.S. PATENT DOCUMENTS 5,397,417 A * 3/1995 Goto et al. .............. 156/272.8

FOREIGN PATENT DOCUMENTS

| DE | 34 05 985 | | 3/1985 |
| DE | 4324970 A1 | * | 1/1995 |
| DE | 44 41 216 | | 5/1996 |
| DE | 19855962 | * | 5/2000 |
| EP | 0 712 706 | | 5/1996 |
| EP | 1 238 789 | | 1/2004 |
| GB | 1063154 | | 3/1967 |
| WO | 91/01225 | | 2/1991 |
| WO | WO 00/06396 | | 2/2000 |

* cited by examiner

Primary Examiner—Blaine Copenheaver
Assistant Examiner—Barbara J. Musser
(74) Attorney, Agent, or Firm—Shlesinger, Arkwright & Garvey LLP

(57) ABSTRACT

Method for producing an embossing roller from silicone rubber for the continuous embossing of the surface of a thermoplastic film, with the embossing surface having a negative form of a surface structure to be embossed. An auxiliary roller is provided which is plastic, at least in the region of its circumferential surface. A laser beam is directed onto the circumferential surface and controlled for defining a real imaginary pattern in such a way that a surface structure of the pattern is created as a positive form on the surface. A layer of silicone rubber provided on the surface produces an embossing matrix which is pulled off the surface, turned inside out, and adhered to a surface of an embossing roller, with the negatively structured embossing surface facing outward. Thus, multiple embossing matrices can be created after a one-time structuring of the surface of an auxiliary roller, using a casting process.

2 Claims, No Drawings

METHOD FOR PRODUCING AN EMBOSSING ROLLER FROM SILICONE RUBBER FOR THE CONTINUOUS EMBOSSING OF THE SURFACE OF A THERMOPLASTIC FILM

CROSS REFERENCE TO RELATED APPLICATIONS

This application claims the priority of German Application No. 101 10 922.9, filed Mar. 7, 2001, which is incorporated herein by reference.

FIELD OF THE INVENTION

The invention relates to a method for producing an embossing roller from silicone rubber for the continuous embossing of the surface of a thermoplastic film, with the embossing surface having a negative form of a surface structure to be embossed.

BACKGROUND OF THE INVENTION

A method for producing an embossing roller for the continuous embossing of the surface of a thermoplastic film is known from German Patent 34 05 985 C2, in which the surface structure is derived from a natural grain pattern by means of multiple casting processes. Although this known method leads to the desired result of producing a silicone embossing roller with a continuous surface structure, a significant disadvantage of this known method is the high cost of carrying out the intermediate steps to create the surface structure.

A method of the type described in the preamble of claim 1 is known from German Patent 44 41 216 C2, in which the embossing structure in the embossing surface of an embossing roller made of silicone rubber is created directly by laser beam processing, and the embossing roller is moved, in a location-and surface-dependent manner that is generally known, corresponding to the surface structure of a pattern. This known method also achieves high pattern fidelity, especially for very fine surface structures. An advantage of this known teaching is that the embossing surface of the embossing roller is created directly without any intermediate steps. This results in considerable time savings as well as the option of producing a large variety of different surface structures in comparison to the known method previously described. A disadvantage is that the silicone rubber rollers are very sensitive and susceptible to damage, with the result that after a certain embossing and operating time the existing embossing roller must be replaced by a new embossing roller, which in turn requires complicated processing of the embossing surface, using a laser beam.

OBJECTS AND SUMMARY OF THE INVENTION

An object of the invention is to modify a method for producing an embossing roller from silicone rubber for the continuous embossing of the surface of a thermoplastic film, with the embossing surface having a negative form of a surface structure to be embossed, and to simplify the production of a plurality of embossing rollers for exchange with used embossing rollers.

That object of the invention is achieved by the teaching of a method for producing an embossing roller in which:

a) an auxiliary roller is first produced which is made of plastic or a metallic material, at least in the region of its circumferential surface;

b) the circumferential surface is smooth;

c) a laser beam is directed onto the circumferential surface;

d) the laser beam moves relative to the circumferential surface and is controlled so as to be congruent with the particular site on the surface structure of a real pattern or of an imaginary pattern which is present in the form of data, in such a way that the surface structure of the pattern is created as a positive structure in the circumferential surface of the auxiliary roller;

e) a layer of silicone rubber of uniform thickness is poured or spread onto the positively structured circumferential surface of the auxiliary roller thus formed, and vulcanized to produce an embossing matrix, and f) the embossing matrix is pulled from the circumferential surface of the auxiliary roller, turned inside out, and adhered to a circumferential surface of an embossing roller, with the negatively structured embossing surface facing outward.

DETAILED DESCRIPTION OF THE INVENTION

The invention relates to a method for producing an embossing roller from silicone rubber for the continuous embossing of the surface of a thermoplastic film, with the embossing surface having a negative form of a surface structure to be embossed, in particular a grain. First an auxiliary roller is produced which is made of plastic, at least in the region of its circumferential surface. A laser beam is directed onto the smooth circumferential surface in such a way that said laser beam moves relative to the circumferential surface. In addition, the laser beam is controlled so as to be congruent with the particular site on the surface structure of a real pattern or of an imaginary pattern which is present in the form of data, in such a way that the surface structure of the pattern is created as a positive form in the circumferential surface. A layer of silicone rubber of uniform thickness is poured or spread onto this circumferential surface of the auxiliary roller and vulcanized to produce an embossing matrix which is pulled off the circumferential surface, turned inside out, and adhered to a circumferential surface of an embossing roller, with the negatively structured embossing surface facing outward. The method enables embossing matrices to be created several times after a one-time structuring of the surface of an auxiliary roller, using a simple, time-saving, and economical casting process.

The basic concept of the invention is to modify the known method for structuring the surface of a roller, relying on a pattern, in such a way that the embossing surface is duplicated not by laser processing, but instead by a casting process. Embossing rollers produced using this casting process create surfaces on thermoplastic films whose surface quality is equivalent to that obtainable via the state-of-the-art method according to the aforementioned German Patent 44 41 216 C2.

That casting process is made possible by using an auxiliary roller in whose smooth surface the embossing structure is created not in the negative form, as in the previously described known method, but rather in the positive form.

Thus, it is possible to directly create an embossing surface in silicone rubber by casting from the surface of the auxiliary roller. To this end, a layer of silicone rubber of uniform thickness is poured or spread onto the surface of the auxiliary roller having a positive embossing structure and vulcanized to produce an embossing matrix in such a way that an embossing surface with a negative structure is formed in said embossing matrix. After vulcanization, the tubular embossing matrix is turned inside out and adhered to a circumferential surface of an embossing roller, with the negatively structured embossing surface facing outward. That embossing roller can then be used directly for the continuous embossing of the surface of a thermoplastic surface.

A large number of embossing matrices may be created from the positively structured surface of the auxiliary roller. Because this casting process is simple and does not require much time, it is not absolutely necessary to have several replacement embossing rollers on hand. If needed, an embossing matrix can always be quickly created and adhered to an embossing roller.

Of course, it is important that the embossing matrix made of silicone rubber be pulled off the surface of the auxiliary roller after vulcanization. For this reason, silicone rubber is less suitable as the plastic material in the region of the circumferential surface of the auxiliary roller because separating agents can damage the fine structure of the embossing surface.

A development of the invention therefore provides for the plastic in the region of the surface of the auxiliary roller to be disposed in such a way that the silicone rubber poured or spread onto this surface may be separated from the surface of the auxiliary roller after vulcanization. The plastic in the region of the circumferential surface of the auxiliary roller is preferably nitrile butadiene rubber. The method according to the invention is applicable not only to an embossing roller, but in a similar fashion is also applicable to an embossing stamp for the discontinuous embossing of the surface of a thermoplastic film.

The control signal for the laser may be obtained either by scanning a surface structure that is physically present, such as a leather pattern, or from digitally created data fields. In each case the control signal may be processed, for example, by defamiliarization, before sending to the laser.

EXAMPLE

A layer of nitrile butadiene rubber was first applied to an auxiliary roller, preferably made of steel, having a smooth circumferential surface. The auxiliary roller was rotated, and a laser beam was led parallel to the rotational axis of the auxiliary roller over the circumferential surface thereof in such a way that essentially the entire circumferential surface was coated. During this movement of the laser beam relative to the surface of the auxiliary roller, the intensity of the laser beam was regulated as a function of a control signal obtained by scanning the surface of a pattern. The surface was scanned optically or mechanically, and an electrical signal corresponding to this scanning was generated which was directly used for controlling the laser. The polarity of the electrical signal was such that the embossing structure created in the surface of the auxiliary roller was a positive form of the surface structure of the desired surface structure to be created.

After the entire surface of the auxiliary roller was provided with a positive embossing structure in this manner, a layer of

What is claimed is:

1. A method of producing an embossing roller having an embossing surface made of silicone rubber for continuously embossing the surface of a thermoplastic film, the embossing surface having a negative form of a to-be-embossed surface structure:

a) first an auxiliary roller is produced, which is comprised of a layer of a material at least in the region of its circumferential surface;

b) the circumferential surface being smooth;

c) a laser beam being directed at the circumferential surface;

d) the laser beam moving relative to the circumferential surface, and being controlled in accordance with a respective surface structure site of a real or imaginary pattern—present as data—such that the pattern surface structure is produced as a positive structure in the circumferential surface of the auxiliary roller;

e) a layer of silicone rubber of uniform thickness being poured or spread onto the positively structured circumferential surface of the auxiliary roller thus formed, and vulcanized to produce an embossing copy;

f) the embossing copy being removed from the circumferential surface of the auxiliary roller, being turned inside out, and with the negative-structured embossing surface facing outwardly and being adhered to a circumferential surface of an embossing roller; and g) the material in the region of the circumferential surface of the auxiliary roller being nitrile butadiene rubber (NbR).

2. Method according to claim 1, wherein:

a) the embossing surface having a negative form of a to-be-embossed surface structure includes a grain.

* * * * *